(12) United States Patent
Savu et al.

(10) Patent No.: US 7,893,144 B2
(45) Date of Patent: *Feb. 22, 2011

(54) POLYOXYALKYLENE AMMONIUM SALTS AND THEIR USE AS ANTISTATIC AGENTS

(75) Inventors: Patricia M. Savu, Maplewood, MN (US); William M. Lamanna, Stillwater, MN (US); Thomas P. Klun, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 181 days.

This patent is subject to a terminal disclaimer.

(21) Appl. No.: 11/781,537

(22) Filed: Jul. 23, 2007

(65) Prior Publication Data

US 2008/0033078 A1    Feb. 7, 2008

Related U.S. Application Data

(62) Division of application No. 09/992,879, filed on Nov. 5, 2001, now abandoned.

(60) Provisional application No. 60/289,964, filed on May 10, 2001.

(51) Int. Cl.
| | |
|---|---|
| C07C 250/00 | (2006.01) |
| C08G 18/28 | (2006.01) |
| C08G 18/66 | (2006.01) |
| C08J 7/04 | (2006.01) |
| C09J 7/02 | (2006.01) |
| C08K 5/00 | (2006.01) |
| C08K 5/06 | (2006.01) |
| C08K 5/07 | (2006.01) |
| C08K 5/43 | (2006.01) |

(52) U.S. Cl. ............... 524/186; 524/168; 524/210; 524/356; 524/366; 568/583

(58) Field of Classification Search .............. 568/583; 524/168, 186, 210, 356, 366

See application file for complete search history.

(56) References Cited

U.S. PATENT DOCUMENTS

| | | | |
|---|---|---|---|
| 2,701,814 A | 2/1955 | Smith | |
| 2,732,398 A | 1/1956 | Brice et al. | |
| 2,803,656 A | 8/1957 | Ahlbrecht et al. | |
| 3,476,753 A | 11/1969 | Hansen | |
| 3,723,512 A | 3/1973 | Niederprum et al. | |
| 3,728,151 A | 4/1973 | Sherman et al. | |
| 3,816,229 A | 6/1974 | Bierbrauber | |
| 3,896,035 A | 7/1975 | Schultz et al. | |
| 3,899,563 A | 8/1975 | Oxenrider et al. | |
| 3,901,727 A | 8/1975 | Loudas | |
| 3,916,053 A | 10/1975 | Sherman et al. | |
| 3,968,066 A | 7/1976 | Mueller | |
| 4,014,880 A | 3/1977 | Dowd et al. | |
| 4,043,923 A | 8/1977 | Loudas | |
| 4,313,978 A | 2/1982 | Stevens et al. | |
| 4,335,201 A | 6/1982 | Miller et al. | |
| 4,439,505 A | 3/1984 | Perlstein et al. | |
| 4,478,922 A | 10/1984 | Perlstein et al. | |
| 4,582,781 A | 4/1986 | Chen et al. | |
| 4,847,187 A | 7/1989 | Ono et al. | |
| 4,939,204 A | 7/1990 | Efford | |
| 4,975,363 A | 12/1990 | Cavallo et al. | |
| 5,064,699 A | 11/1991 | Havens et al. | |
| 5,145,727 A | 9/1992 | Potts et al. | |
| 5,149,576 A | 9/1992 | Potts et al. | |
| 5,171,641 A | 12/1992 | Roberts et al. | |
| 5,273,840 A | 12/1993 | Dominey | |
| 5,362,613 A | 11/1994 | Shiratsuchi et al. | |
| 5,446,134 A | 8/1995 | Armand et al. | |
| 5,472,455 A | 12/1995 | Mehreteab et al. | |
| 5,478,486 A | 12/1995 | Incorvia | |
| 5,502,251 A | 3/1996 | Pohmer et al. | |
| 5,503,967 A | 4/1996 | Furlan et al. | |
| 5,514,493 A | 5/1996 | Waddell et al. | |
| 5,518,788 A | 5/1996 | Invie | |
| 5,525,261 A | 6/1996 | Incorvia et al. | |
| 5,534,192 A | 7/1996 | Incorvia et al. | |
| 5,541,049 A | 7/1996 | Ballerini et al. | |
| 5,554,664 A | 9/1996 | Lamanna et al. | |
| 5,591,482 A | 1/1997 | He et al. | |
| 5,688,884 A | 11/1997 | Baker et al. | |
| 5,723,664 A | 3/1998 | Sakaguchi et al. | |
| 5,744,295 A | 4/1998 | Pitt et al. | |
| 5,874,616 A | 2/1999 | Howells et al. | |

(Continued)

FOREIGN PATENT DOCUMENTS

| | | |
|---|---|---|
| BE | 876238 | 11/1979 |
| DE | 4016535 | 9/1993 |
| EP | 0 047 903 B1 | 8/1981 |
| EP | 0 398 353 A1 | 11/1990 |
| EP | 0 416 741 A1 | 3/1991 |
| EP | 0 363 094 B1 | 8/1993 |
| EP | 0 650 088 | 4/1995 |
| EP | 0 690 338 | 3/1996 |
| EP | 0 752 711 A1 | 1/1997 |
| EP | 0 331 030 A1 | 2/1999 |

(Continued)

OTHER PUBLICATIONS

Product Information: "Fatty Amine Ethoxylates," Huntsman Corporation, Salt Lake City, UT, (Apr. 9, 2001), 2 pages.

(Continued)

*Primary Examiner*—Patrick D Niland
(74) *Attorney, Agent, or Firm*—Kent S. Kokko (57) ABSTRACT

The present invention provides polyoxyalkylene ammonium imide or methide salts and their use as antistatic agents. Another embodiment provides articles comprising these salts, and processes for making and using these salts.

5 Claims, 1 Drawing Sheet

U.S. PATENT DOCUMENTS

| | | | |
|---|---|---|---|
| 5,965,206 A | 10/1999 | Hilti et al. | |
| 6,294,289 B1 | 9/2001 | Fanta et al. | |
| 6,319,428 B1 | 11/2001 | Michot et al. | |
| 6,372,829 B1 * | 4/2002 | Lamanna et al. | 524/99 |
| 6,924,329 B2 * | 8/2005 | Klun et al. | 524/100 |

FOREIGN PATENT DOCUMENTS

| | | |
|---|---|---|
| EP | 0 663 612 B1 | 3/2000 |
| JP | 46-25558 | 7/1971 |
| JP | 47-20201 | 6/1972 |
| JP | 50045055 | 4/1975 |
| JP | 53-15747 | 5/1978 |
| JP | 55149938 | 11/1980 |
| JP | 60221442 | 11/1985 |
| JP | 62225517 | 10/1987 |
| JP | 63071923 | 4/1988 |
| JP | 63295667 | 12/1988 |
| JP | 63308032 | 12/1988 |
| JP | 01075534 | 3/1989 |
| JP | 01-306678 | 12/1989 |
| JP | 11116752 | 4/1990 |
| JP | 3-41160 | 2/1991 |
| JP | 5-302077 | 11/1993 |
| JP | 05289224 | 11/1993 |
| JP | 08092450 | 4/1996 |
| JP | 08208889 | 8/1996 |
| JP | 08100169 | 9/1996 |
| JP | 09255939 | 9/1997 |
| JP | 11092751 | 6/1999 |
| SU | 406849 | 8/1974 |
| SU | 427962 | 6/1975 |
| SU | 446522 | 7/1975 |
| SU | 448199 | 10/1975 |
| SU | 468527 | 11/1980 |
| SU | 802429 | 2/1981 |
| SU | 802430 | 2/1981 |
| SU | 854949 | 8/1981 |
| SU | 749081 | 12/1983 |
| SU | 749084 | 12/1983 |
| WO | WO 96/15479 | 5/1996 |
| WO | WO 96/24929 | 8/1996 |
| WO | WO 99/02611 | 1/1999 |
| WO | WO 99/30381 | 6/1999 |
| WO | WO 01/25326 | 4/2001 |
| WO | WO 01/49925 | 7/2001 |
| ZA | 9804155 | 5/1998 |

OTHER PUBLICATIONS

Product Information: "JEFFAMINE® Polyoxyalkylene Amines," Huntsman Corporation, Salt Lake City, UT, (Apr. 9, 2001), 2 pages.
Book Excerpt: *Amphoteric Surfactants*, edited by Eric G. Lomax, Marcel Dekker Inc., (1996), pp. 13-17.
Book Excerpt: *Organofluorine Chemicals and Their Industrial Applications*, edited by R. E. Banks, Ellis Horwood Ltd. (1979), pp. 53-57.
Article: Hendricks, "Industrial Fluorochemicals," *Ind. Eno. Chem.*, vol. 45, No. 1, (Jan. 1953), pp. 99-105.
Article: Bernett et al., "Wetting of Low-Energy Solids by Aqueous Solutions of Highly Fluorinated Acids and Salts[1]," *J. Phys. Chem.*, vol. 63, (Nov. 1959), pp. 1911-1916.
Book Page: *Preparation, Properties, and Industrial Applications of Organofluorine Compounds*, edited by R. E. Banks, Ellis Horwood Ltd. (1982), p. 25.
Article: Koshar et al., "Bis(perfluoroalkylsulfonyl)methanes and Related Disulfones," *J. Org. Chem.*, vol. 38, No. 19, (1973), pp. 3358-3363.
Article: Wente, "Superfine Thermoplastic Fibers," *Industrial and Engineering Chemistry*, vol. 48, No. 8, (Aug. 1956), pp. 1342-1346.
Report: Wente et al., "Manufacture of Superfine Organic Fibers," Naval Research Laboratory Report 4364, (May 25, 1954), pp. 1-15.
Article: Davis, "The Separation of Airborne Dust and Particles", *The Institution of Mechanical Engineers*, pp. 185-198.
J. Am. Chem. Soc., "Fluorinated Surfactants and Repellents", Jimmie R. Baran, Jr., Second Edition, vol. 123, No. 36, 2001.
ASTM Standard D-257, Standard Test Methods for DC Resistance or Conductance of Insulating Materials, pp. 106-115.

* cited by examiner

*Fig. 1*

POLYOXYALKYLENE AMMONIUM SALTS AND THEIR USE AS ANTISTATIC AGENTS

CROSS-REFERENCE TO RELATED APPLICATION

This application is a divisional of U.S. Ser. No. 09/992,879, filed Nov. 5, 2001, now abandoned, the disclosure of which is incorporated by reference in its entirety herein, which claimed priority to U.S. Provisional Application No. 60/289,964, filed May 10, 2001.

FIELD OF INVENTION

This invention relates to antistats or antistatic agents. More particularly, this invention relates to polyoxyalkylene ammonium imide and methide salts and their use as antistatic agents.

BACKGROUND OF THE INVENTION

Antistats or antistatic agents are used to dissipate electrostatic or static charge. Electrostatic charge buildup is responsible for a variety of problems in the processing and the use of many industrial products and materials. Electrostatic charging can cause materials to stick together or to repel one another. In addition, static charge buildup can cause objects to attract dirt and dust that can lead to fabrication or soiling problems and can impair product performance.

Sudden electrostatic discharges from insulating objects can also be a serious problem. With photographic film, these discharges can cause fogging and the appearance of artifacts. When flammable materials are present, a static electric discharge can serve as an ignition source, resulting in fires and/or explosions.

Electrostatic charge is a particular problem in the electronics industry, because modern electronic devices are extremely susceptible to permanent damage by electrostatic discharges. The buildup of electrostatic charge on insulating objects is especially common and problematic under conditions of low humidity and when liquids or solids move in contact with one another (tribocharging).

Static charge build-up can be controlled by increasing the electrical conductivity of a material. This can be accomplished by increasing ionic or electronic conductivity. The most common means of controlling static accumulation today is by increasing electrical conductivity through moisture adsorption. This is commonly achieved by adding moisture to the surrounding air (humidification) or by the use of hygroscopic antistatic agents, which are generally referred to as humectants because they rely on the adsorption of atmospheric moisture for their effectiveness. Most antistatic agents operate by dissipating static charge as it builds up; thus, static decay rate and surface conductivity are common measures of the effectiveness of antistatic agents.

Antistatic agents can be applied to the surface (external antistat) or incorporated into the bulk (internal antistat) of the otherwise insulating material. Internal antistats are commonly employed in polymers such as plastics. Generally, internal antistats fall into one of the following classes: (1) ones that are mixed directly into a molten polymer during melt processing; (2) ones that are mixed into a polymer solution, coated, and dried, or (3) ones that dissolve into a monomer (with or without a solvent) that is subsequently polymerized.

Known antistatic agents cover a broad range of chemical classes, including organic amines and amides, esters of fatty acids, organic acids, polyoxyethylene derivatives, polyhydridic alcohols, metals, carbon black, semiconductors, and various organic and inorganic salts. Many are also surfactants and can be neutral or ionic in nature.

Many low molecular weight, neutral antistats have sufficiently high vapor pressures and thus are unsuitable for use at high temperatures (e.g., polymer melt processing) due to material losses that occur via evaporation. Many other neutral antistats have insufficient thermal stability to survive polymer melt processing or other high temperature processing conditions.

Most nonmetallic antistats are humectants that rely on the adsorption and conductivity of water for charge dissipation. Thus, their effectiveness is typically diminished at low atmospheric humidity. Because many of these antistatic agents are also water soluble, they are easily removed by exposure of the material to water (e.g., washing) and therefore are not very durable.

Metal salts of inorganic, organic, and fluoroorganic anions are also useful as antistatic agents in certain polymer compositions. Alkali metal salts are most commonly employed due to cost and toxicity considerations and to the high affinity of alkali metal cations, especially lithium, for water. But most metal salts are not compatible with polymers of moderate to low polarity, such as polypropylene, polyester, and polycarbonate. This incompatibility can result in inadequate antistat performance and/or an unacceptable reduction in physical properties or transparency in a finished polymeric article. Consequently, the use of metal salts as internal antistatic agents is generally limited to highly polar and/or hydrophilic polymer matrices.

Photographic applications often have additional performance criteria that affect the choice of antistatic agent. For example, the antistatic agent preferably does not adversely affect the photographic qualities (e.g., sensitivity, fog, contrast), the image quality (e.g., graininess, sharpness), the performance of processing chemistries, and the coating quality, or lose its antistatic ability over a long time period during storage of photographic material.

U.S. Pat. No. 4,975,363 discloses an antistatic agent that is a fluorinated organic salt. This salt is the reaction product of a polyoxyalkylene amine compound and a fluorinated organic acid compound. The fluorinated organic acid compound is a perfluoroalkanesulfonic acid.

Perfluorooctanesulfonyl fluoride (POSF) derived antistatic agents persist or ultimately degrade in the environment to other perfluorooctyl-containing compounds. It has been reported that certain perfluorooctyl-containing compounds may tend to have low bioelimination rates in living organisms as well as persistence in the environment. This tendency has been cited as a potential concern for some fluorochemical compounds. See, for example, U.S. Pat. No. 5,688,884 (Baker et al.). Introduction of an antistat and its degradation products into the environment may occur either from streams related to the use of the antistat itself or from waste streams/emissions from its manufacture. As a result, there is a desire for fluorine-containing compositions that are effective in providing desired antistat properties and that eliminate more rapidly from the body.

Thus, there remains a need for antistatic agents that exhibit a superior balance of thermal stability, hydrophobicity, low volatility, low corrosivity toward metals and electronic components, durability, and polymer compatibility, that can impart good antistatic performance to a variety of insulating materials over a wide range of humidity levels, and that more rapidly bioeliminate from living organisms.

SUMMARY OF THE INVENTION

The present invention provides imide and methide salts, and their use as antistatic agents. Advantageously, the salts or antistatic agents of the present invention are comprised of anions that have outstanding surface activity, conductivity, and blooming while being physically and chemically stable during their use as antistatic agents. But the salts of the present invention are expected to gradually degrade in the environment and will likely more rapidly bioeliminate than perfluorooctane sulfonate antistats. In addition, the salts of the present invention can be produced from lower cost intermediates, such as $CF_3SO_2F$ and $C_4F_9SO_2F$, compared to antistats derived from $C_8F_{17}SO_2F$ (POSF), which are produced in relatively low yields by electrochemical fluorination (ECF).

The present invention comprises an antistatic agent comprising a salt consisting of (a) at least one anion having one of the following formulae:

(A)

(B)

wherein each $R_f$ is independently a fluorinated alkyl or aryl group that may be cyclic or acyclic, saturated or unsaturated, and may optionally contain catenated ("in-chain") or terminal heteroatoms such as N, O, and S (e.g., $-SF_4-$, $-SF_5$); Q is independently an $SO_2$ or a CO linking group and X is selected from the group $QR_f$, CN, halogen, H, alkyl, aryl, Q-alkyl, and Q-aryl; and any two contiguous $R_f$ groups may be linked to form a ring; and (b) at least one cation having at least one polyoxyalkylene moiety bonded to at least one cationic nitrogen center.

This cation preferably is a polyoxyalkylene ammonium compound represented by one of the following formulae:

(I)

(II)

(III)

(IV)

(V)

and (VI)

$^+N[(R^2)_{4-d}][[POA]R^3]_d$ (VII)

wherein R is an alkoxy group that may be substituted, $R^1$ is a hydrogen atom or an alkyl (such as methyl, ethyl, or propyl) group, n is an integer of 3 to 50, b is an integer of 5 to 150, a and c, the same or different, each is an integer from 0 to 5, such that a+c is an integer from 2 to 5, A is a $CH\equiv$, $CH_3C\equiv$, $CH_3CH_2C\equiv$, or a x, y and z, equal or different, are integers of 1 to 30 such that the sum of $x+y+z \geqq 5$, POA is either a homopolymer or a copolymer that is random, blocked, or alternating, and POA comprises 2 to 50 units represented by the formula $((CH_2)_m CH(R^4)O)$ where each unit independently has m, an integer from 1 to 4, and $R^4$. $R^4$ is independently hydrogen or a lower alkyl group (i.e., containing 1 to 4 carbon atoms). $R^2$ is independently an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). $R^3$ is independently hydrogen, an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). And d is an integer from 1 to 4.

The antistatic agents of the present invention can be used as an additive (part of a blend or an internal antistat) or as a coating (topical treatment or an external antistat) to impart antistat characteristics to polymers or to other insulating materials.

Another aspect of the present invention is an article, such as a fiber, fabric, film (x-ray or photographic), x-ray screen, electronic component, electronic packaging, compact disc, coating, molded object, or blown object comprising the antistatic agent of the present invention.

Yet another aspect of the present invention is a blend (e.g., a melt blend) of the antistatic agent of the present invention and an insulating material.

BRIEF DESCRIPTION OF THE DRAWINGS

This FIGURE is intended to be merely illustrative and non-limiting.

DETAILED DESCRIPTION OF ILLUSTRATIVE EMBODIMENTS

The present invention relates to imide and methide salts and their use as antistatic agents. Antistatic agents and antistats are used interchangeably herein. Antistatic agents preferably provide high ionic conductivity, good solubility in organic media, good stability, and good blooming. Advantageously, the salts of the present invention exhibit all of these features. In addition, certain salts of the present invention are expected to more rapidly bioeliminate than other known fluorinated antistats. Thus, certain salts of the present invention are expected to have superior environmental properties.

Although stable over the relatively short time frame of typical commercial applications, it is expected that the imide and methide antistats of the present invention will gradually break down to various degradation products when exposed over long time periods to biological, thermal, oxidative, hydrolytic, and photolytic conditions found in the environment. For example, compositions comprising bis(perfluorobutanesulfonyl) imide anion moieties are expected to slowly, but ultimately degrade to perfluorobutanesulfonate salts (i.e., salts of $C_4F_9SO_3^-$). It has been surprisingly found that perfluorobutanesulfonate, tested in the form of its potassium salt, eliminates from the body more rapidly than perfluorohexanesulfonate and much more rapidly than perfluorooctanesulfonate.

A "blend" is defined herein as a mixture of at least one antistat and at least one insulating material or a reactive precursor to the insulating material, such as a monomer, a curable oligomer, or a curable polymer.

A "topical treatment" is defined herein as at least one antistat applied to the surface of a preformed insulating material or substrate, typically in a solvent or a dispersant.

The salts of the present invention have at least one imide or methide anion and at least one polyoxyalkylene ammonium cation.

Anion

The anions of the present invention are fluorinated imide or methide anions. Preferably, the anions are carbonyl-sulfonyl imides, di-sulfonyl imides, or trisulfonyl methides, and more preferably, the anions are di-sulfonyl imides.

The fluorinated anions of the present invention are represented by one of the following formulae:

(A)

(B)

wherein each $R_f$ is independently a fluorinated alkyl or aryl group that may be cyclic or acyclic, saturated or unsaturated, and may optionally contain catenated ("in-chain") or terminal heteroatoms such as N, O, and S (e.g., $—SF_4—$ or $—SF_5$). Q is independently an $SO_2$ or a CO linking group. X is selected from the group consisting of $QR_f$, CN, halogen, H, alkyl, aryl, Q-alkyl, and Q-aryl. Any two contiguous $R_f$ groups may be linked to form a ring.

When $R_f$ is attached to CO, $R_f$ has from 1 to 7 carbon atoms, preferably 3 to 6 carbon atoms; and when $R_f$ is attached to $SO_2$, $R_f$ has from 1 to 6 carbon atoms, preferably 1 to 4 carbon atoms.

A preferred X group is $QR_f$, where Q is most preferably $SO_2$, and $R_f$ is most preferably a perfluoroalkyl group.

Preferred anions for blend compositions and applications include bis(perfluoroalkanesulfonyl) imides, and tris(perfluoroalkanesulfonyl) methides; and more preferably, bis(perfluoroalkanesulfonyl) imides. Preferred anions for the topical treatment compositions and applications are perfluorinated where all X's are $QR_f$. More preferably, all Q's are $SO_2$. Most preferably, the anion(s) is a bis(perfluoroalkanesulfonyl) imide.

The anions can be either fully fluorinated, that is perfluorinated, or partially fluorinated (within the organic portion thereof). Preferred fluoroorganic anions include those that comprise at least one highly fluorinated alkanesulfonyl group, that is, a perfluoroalkanesulfonyl group or a partially fluorinated alkanesulfonyl group wherein all non-fluorine carbon-bonded substituents are bonded to carbon atoms other than the carbon atom that is directly bonded to the sulfonyl group (preferably, all non-fluorine carbon-bonded substituents are bonded to carbon atoms that are more than two carbon atoms away from the sulfonyl group).

Preferably, the anions are at least about 80 percent fluorinated (that is, at least about 80 percent of the carbon-bonded substituents of the anions are fluorine atoms). More preferably, the anions are perfluorinated (that is, fully fluorinated, where all of the carbon-bonded substituents are fluorine atoms). The anions, including the preferred perfluorinated anions, can contain one or more catenated (that is, in-chain) or terminal heteroatoms such as, for example, nitrogen, oxygen, or sulfur (e.g., $SF_5$ or $SF_4$).

Preferably, the fluorinated imide anions of the present invention are carbonyl-sulfonyl imides or disulfonyl imides and more preferably, the fluorinated imide anions are di-sulfonyl imides. Preferably, the fluorinated methide anions of the present invention are trisulfonyl methides.

Particularly useful imide and methide anions of the present invention are when all X groups are $QR_f$, all Q's are sulfonyl groups, and all $R_f$'s are perfluoroalkyl groups (e.g., bis(perfluoroalkanesulfonyl) imides and tris(perfluoroalkanesulfonyl) methides).

The imides and methide anions of the present invention may be monofunctional or difunctional anions (e.g., two anionic centers per chain), but are preferably mono functional.

Examples of suitable anions include, but are not limited to,

The di-sulfonyl imides may be prepared from perfluoroalkanesulfonyl halides using methods that are well known in the art and described in U.S. Pat. Nos. 5,874,616; 5,723,664, and South African Patent No. ZA 9804155. Generally, this anion can be prepared by reacting $2R_fSO_2X$ (where X=halogen) with $NH_3$ in the presence of $Et_3N$ (or a similar base) or by reacting $R_fSO_2X$ with $R_fSO_2NH_2$ in the presence of $Et_3N$ (or a similar base).

Perfluorinated mixed sulfonyl carbonyl imides may be prepared by the reaction of perfluoroalkanesulfonamide salts, such as $Na^+{}^-NH(SO_2R_f)$ with trifluoroacetic anhydride and higher homologous, as described in Yu. L. Yagupolskii et al.; Russ. J. Org. Chem., 35, 1, 1999, pp. 22-25. Alternative methods of preparing sulfonylcarbonyl imides are described in F. Ye et al., J. Fluorine Chem., 81, 2, 1997, pp. 193-196; and L. M. Yagupolskii et al., Russ. J. Org. Chem., 35, 1, 1999, pp. 22-25 and Zh. Org. Khim., 35, 1, 1999, pp. 29-32.

Perfluorinated dicarbonyl imides may be prepared by the reaction of a perfluorinated acid anhydride, $R_fCOOCOR_f$, with a perfluorinated carboxamide $R_fCONH_2$, as described in U.S. Pat. No. 2,701,814. Alternative routes to the preparation of these dicarbonyl imides are also described in U.S. Pat. No. 2,701,814 as well as in J. A. Young et al., J. Amer. Chem. Soc., 82, 1960, pp. 4553-4556; dePasquale, J. Fluorine Chem., 8, 1976, pp. 311, 316, 318, 320; S. A. Mazalov et al., J. Gen. Chem., USSR (Engl. Transl.), 36, 1966, pp. 1344-1350.

Preparation of hybrid imides comprising one fluorinated alkyl group and one hydrocarbon alkyl group is described in U.S. Pat. No. 5,502,251.

The preparation of the cyano-substituted imides and methides is described in U.S. Pat. Nos. 6,294,289 and 5,446,134.

The preparation of other fluorinated methide anions is described in U.S. Pat. Nos. 5,446,134, 5,273,840, 5,554,664, 5,514,493, and in Turowsky & Seppelt, Inorg. Chem., 27, 2135-2137 (1988).

Polyoxyalkylene Ammonium Compounds

In the present invention, the cations are polyoxyalkylene ammonium compounds. These polyoxyalkylene ammonium compounds can be a monofunctional or a multifunctional cation. These polyoxyalkylene ammonium compounds contain ammonium groups bonded to the end of a polyoxyalkylene (POA) chain. The polyoxyalkylene chain is typically based either on propylene oxide, ethylene oxide, or mixed ethylene/propylene oxide. The polyoxyalkylene ammonium compounds comprise mono-ammonium, di-ammonium, and tri-ammonium compounds having molecular weights ranging from about 200 to about 10,000.

Particularly representative polyoxyalkylene ammonium cations are those represented by the following general formulae:

wherein R is an alkoxy group that may be substituted, $R^1$ is a hydrogen atom or an alkyl (such as methyl, ethyl, or propyl) group, n is an integer of 3 to 50, b is an integer of 5 to 150, a and c, the same or different, each is an integer from 0 to 5, such that a+c is an integer from 2 to 5, A is a CH≡, $CH_3C$≡, $CH_3CH_2C$≡, or a x, y and z, equal or different, are integers of 1 to 30 such that the sum of x+y+z≧5, POA is either a homopolymer or a copolymer that is random, blocked, or alternating, and POA comprises 2 to 50 units represented by the formula $((CH_2)_m CH(R^4)O)$ where each unit independently has m, an integer from 1 to 4, and $R^4$. $R^4$ is independently hydrogen or a lower alkyl group (i.e., containing 1 to 4 carbon atoms). $R^2$ is independently an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). $R^3$ is independently hydrogen, an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). And d is an integer from 1 to 4.

Examples of polyoxyalkylene amine compounds useful as precursors to the cations of the present invention are illustrated below. The number of repeat units for the polyoxyalkylene moieties is approximate.

wherein b is ~8.5 and a + c is ~2.5 wherein b is ~15.5 and a + c is ~2.5 wherein x + y + z~5-6 wherein x + y + z~30

The polyoxyalkylene ammonium compounds of the present invention can be prepared using methods known in the art.

Examples of difunctional or trifunctional amine terminated polyethylene oxides useful as precursors to the antistats of the present invention include, but are not limited to, JEFFAMINE™ Polyalkylene Amines, available from Huntsman Corporation, Salt Lake City, Utah. JEFFAMINE™ Polyalkylene Amines are generally described as containing primary amino groups attached to the terminus of a polyether backbone. The polyether backbone is based either on propylene oxide, ethylene oxide, or mixed propylene oxide/ethylene oxide.

Examples of quaternary polyoxyalkylene ammonium salts useful as precursors to the antistats of the present invention include $[C_{12}H_{25}N^+(CH_3)[(CH_2CH_2O)_mH(CH_2CH_2O)_nH]^-Cl$; (m+n=15), which is ETHOQUAD™ C/25, and $[C_{18}H_{37}N^+(CH_3)(CH_2CH_2O)_mH(CH_2CH_2O)_nH]^-Cl$; (m+n=15), which is ETHOQUAD™ 18/25, (both are available from Akzo Nobel Surface Chemistry LLC, Chicago, Ill.). In addition, $[C_{12}H_{25}N^+(CH_3)(CH_2CH_2O)_mH(CH_2CH_2O)_nH]^-OSO_3CH_3$; (m+n=5), which is derived from ETHOMEEN™ C/15 (available from Akzo Nobel Surface Chemistry LLC.) via its reaction with dimethylsulfate, is a useful precursor to the antistats of the present invention.

Antistatic Agent

Certain antistatic agents of the present invention have good surfactant properties. In addition, these antistats appear to exhibit good blooming properties, particularly where $R_f$ is a perfluoroalkyl group comprising at least 3, preferably at least 4 carbon atoms. While not wishing to be bound by theory, it is believed that to minimize the interfacial tension, the fluorinated segment of the salt migrates to and orients itself at the coating surface or air interface, causing the antistatic agent to concentrate at the surface of the coating. Thus, the coating surface would be enriched by the antistatic agent. By being concentrated at the surface of the antistatic coating layer, the salts of the present invention act very effectively as an antistatic agent to dissipate electrostatic charge.

The antistats of the present invention include imide and methide salts of mono-functional, di-functional, or tri-functional ammonium terminated polyethylene oxides.

There are two general methods that can be used to prepare the antistatic agents of the present invention. First, one can protonate the amine group of a polyoxoalkylene amine with the conjugate acid of the imide or methide anion (preferably in the presence of hydroxylic or ether containing solvents such as water, isopropyl ether, methyl t-butyl ether, diethyl ether, or the like), and then isolate the antistatic agent using techniques known in the art. Second, ion exchange, or methathesis reactions, which are well known in the art, can be used for the polyoxyalkylene ammonium salts of simple anions such as halide, sulfate, nitrate, mesylate, or acetate, and the like.

Particularly useful antistats of the present invention include, but are not limited to, bis(perfluoroalkanesulfonyl) imides (a particularly useful imide is bis(perfluorobutanesulfonyl) imide)) of difunctional or trifunctional ammonium terminated polyethylene oxides.

Figure 1:
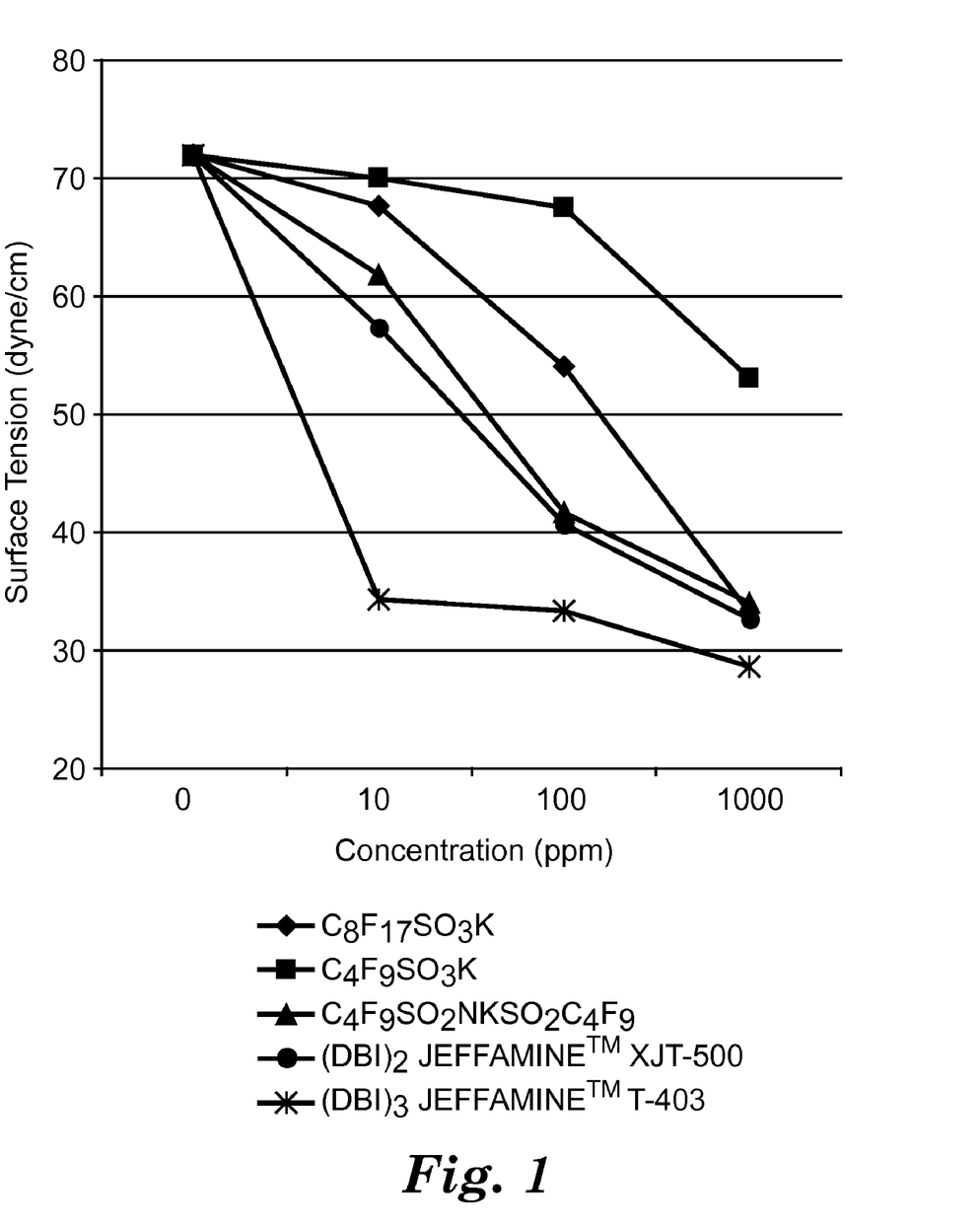
FIG. 1 is a graph of the surface tensions (dyne/cm) versus concentration (ppm) of two JEFFAMINE™ salts of bis(perfluorobutanesulfonyl) imide (DBI), the potassium salts of the perfluoroalkanesulfonates, and potassium bis(perfluorobutanesulfonyl) imide.

The protonated JEFFAMINE™ salts of bis(perfluorobutanesulfonyl) imide ((DBI)$_2$ JEFFAMINE™ XJT-500 and (DBI)$_3$T-403) function as antistats and are especially preferred. In FIG. 1, the surface tensions versus concentration profiles of two JEFFAMINE™ salts and the potassium salt of bis(perfluorobutanesulfonyl) imide in water are shown and compared with the potassium salts of the perfluoroalkanesulfonates. Potassium perfluorobutanesulfonate (FR-2025) is available from Minnesota Mining and Manufacturing Company, St. Paul, Minn.; and potassium perfluooctanesulfonate was prepared essentially according to U.S. Pat. No. 2,732,398, with the exception that $CH_3(CH_2)_7SO_2Cl$ was replaced with $CH_3(CH_2)_7SO_2F$. As FIG. 1 illustrates, the antistatic agents of the present invention have good surface active properties. Surprisingly, despite the shorter perfluoroalkyl chain length, the JEFFAMINE™ and potassium salts of bis(perfluorobutanesulfonyl) imide provided comparable surface activity when compared to the potassium salt of perfluorooctane sulfonate and are superior to the potassium salt of perfluorobutane sufonate.

Examples of antistatic agents of the present invention include, but are not limited to:

$C_{12}H_{25}N^+[CH_3][(CH_2CH_2O)_mH][(CH_2CH_2O)_nH]$ $^-N(SO_2C_4F_9)_2$; (m + n = 15),

$C_{18}H_{37}N^+[CH_3][(CH_2CH_2O)_mH][(CH_2CH_2O)_nH]$ $^-N(SO_2C_4F_9)_2$; (m + n = 15), $C_{12}H_{25}N^+[CH_3][(CH_2CH_2O)_mH][(CH_2CH_2O)_nH]$ $^-N(SO_2C_4F_9)(SO_2C_8H_{17})$; (m + n = 5), where m + n = 15

The antistats can be solids or liquids under ambient conditions.

For use as polymer melt additives, the antistats are preferably stable at temperatures of about 240° C. and above (more preferably, about 280° C. and above). (In other words, the thermal decomposition temperature (i.e., the temperature where there is 5% or more weight loss using thermo gravimetric analysis (TGA) as described in Test Method 1) of the antistats is preferably above these temperatures.) In addition, the antistats are preferably miscible with the insulating materials at the melt processing temperature.

Insulating Materials

The antistatic agents of the present invention can be used in coating compositions or with various insulating materials (i.e., coated directly onto an insulating material or blended with an insulating material) provided these antistatic agents are compatible with the coating and/or insulating material. Thus, the antistatic agent preferably performs well as an antistat and does not adversely affect the other properties of the coating and/or insulating material.

The antistatic agents of the present invention are typically about 0.1 to about 10 weight percent of the antistatic coating, based on the solids in the coating.

Antistatic coatings comprising the antistatic agent of the present invention can be topically applied (either alone or as part of a composition) from aqueous or organic solvents (or binders) to a variety of insulating materials including photographic or x-ray film, x-ray screens, fabric, fibers, electronic components, electronic packaging, compact discs, molded or blown objects (e.g., surgical gowns), and the like. The choice of solvent varies with the insulating material.

The antistats of the present invention can be topically applied to insulating materials that have relatively low surface and bulk conductivity and that are prone to static charge build-up. These materials include both synthetic and naturally occurring polymers (or the reactive precursors thereof, for example, mono- or multifunctional monomers or oligomers) that can be either organic or inorganic in nature, as well as ceramics, glasses, and ceramic/polymer composites, ceramers, or the reactive precursors thereof.

The antistatic agents of the present invention can also be blended with any of the following insulating materials: thermoplastics, thermosets, ceramers, or reactive precursors to these insulating materials. The antistatic blends can be used in a variety of applications such as film, fabric, fibers, electronic components, electronic packaging, compact discs, molded or blown objects, and the like.

Suitable synthetic polymers (which can be either thermoplastic or thermoset) include commodity plastics such as, for example, poly(vinyl chloride), polyethylenes (high density, low density, very low density), polypropylene, polybutylene, and polystyrene; engineering plastics such as, for example, polyesters (including, for example, poly(ethylene terephthalate) and poly(butylene terephthalate)), polyamides (aliphatic, amorphous, aromatic), polycarbonates (for example, aromatic polycarbonates such as those derived from bisphenol A), polyoxymethylenes, polyacrylates and polymethacrylates (for example, poly(methyl methacrylate)), some modified polystyrenes (for example, styrene-acrylonitrile (SAN) and acrylonitrile-butadiene-styrene (ABS) copolymers), high-impact polystyrenes (SB), fluoroplastics, and blends such as poly(phenylene oxide)-polystyrene and polycarbonate-ABS; high-performance plastics such as, for example, liquid crystalline polymers (LCPs), polyetherketone (PEK), polysulfones, polyimides, and polyetherimides; thermosets such as, for example, alkyd resins, phenolic resins, amino resins (for example, melamine and urea resins), epoxy resins, unsaturated polyesters (including so-called vinyl esters), polyurethanes, allylics (for example, polymers derived from allyldiglycolcarbonate), fluoroelastomers, and polyacrylates; and the like and blends thereof. Suitable naturally occurring polymers include proteinaceous materials such as silk, wool, and leather; and cellulosic materials.

The antistatic agents of the present invention can also be combined with monomers, curable oligomers, or polymers followed by polymerization or curing to form a crosslinked thermoset polymer containing the composition. Preferred thermoset polymers include polyurethane, epoxy resins, and unsaturated polyesters.

The antistatic agent of the present invention can further be applied to insulating material using techniques known in the art such as, but not limited to, dip coating, spray coating, swirl coating, spin coating, extrusion hopper coating, curtain coating, gravure coating, air knife coating, and the like. The coating thickness varies as a function of the insulating material.

The antistatic agents of the present invention are particularly suitable for light-sensitive silver halide photographic materials. For example, an antistatic agent of the present invention can be applied as part of an antistatic coating to control and minimize tribocharging during photographic film production, use, and processing. Photographic materials generally consist of at least an insulating material, at least one layer of a silver halide emulsion dispersed in a hydrophilic colloidal binder, and optionally at least one protective layer for the emulsion. One or more auxiliary layers or sub-layers may also be included.

One example of a photographic application is disclosed in EP Publication No. 0792476. In this patent, a spectrally sensitized photothermographic silver halide element is taught. This element comprises a transparent organic polymeric support layer having on at least one surface a photothermographic composition layer that displays uniform image density across its surface when exposed to floodlight or uniform incandescent light exposure at a wavelength of radiation to which the composition is sensitive. The composition layer comprises at least two layers, including a top layer and a photothermographic emulsion layer. The layer comprises a binder, a light insensitive silver source, a reducing agent for silver ion and radiation sensitive silver halide grains, and dyes that absorb the radiation to which the composition is sensitive. In this application, the antistatic agent of the present invention is added to the top layer.

Preparation and Use of Antistats

The antistat of the present invention can be prepared or used by (a) combining at least one antistat and at least one thermoplastic polymer (optionally, along with other additives) and then melt processing the resulting combination; or (b) combining at least one antistat and at least one thermosetting polymer or ceramer or the reactive precursors thereof (optionally, along with other additives) and then allowing the resulting combination to cure, optionally with the application of heat or actinic radiation. Additional processes for preparing the composition include, for example, (c) applying a topical treatment composition comprising at least one antistat to at least a portion of at least one surface of at least one insulating material; (d) dissolving at least one antistat and at least one insulating material in at least one solvent and then casting or coating the resulting solution or topical treatment and allowing evaporation of the solvent, optionally with the application of heat; and (e) combining at least one antistat and at least one monomer or curable oligomers (optionally, along with other additives) and then allowing polymerization of the monomer(s) or curable oligomers to occur, and optionally applying heat or actinic radiation.

To form a melt blend by melt processing, the antistat(s) can be, for example, intimately mixed with pelletized or powdered polymer and then melt processed by known methods such as, for example, molding, melt blowing, melt spinning, or melt extrusion. The antistat can be mixed directly with the polymer or they can be mixed with the polymer in the form of a "master batch" (concentrate) of the additives in the polymer. If desired, an organic solution of the additives can be mixed with powdered or pelletized polymer, followed by drying (to remove solvent) and then by melt processing. Alternatively, the additives can be injected into a molten polymer stream to form a blend immediately prior to, for example, extrusion into fibers or films or molding into articles.

After melt processing, an annealing step can be carried out to enhance the development of antistatic characteristics. In addition to, or in lieu of, this annealing step, the melt processed combination (for example, in the form of a film or a fiber) can also be embossed between two heated rolls, one or both of which can be patterned. An annealing step typically is conducted below the melt temperature of the polymer (for example, in the case of polyamide, at about 100-220° C. for a period of about 30 seconds to about 5 minutes). In some cases, the presence of moisture can improve the effectiveness of the antistat(s), although the presence of moisture is not necessary in order for antistatic characteristics to be obtained.

The antistat(s) can be added to thermoplastic or thermosetting polymers (or, alternatively, to other insulating materials) in amounts sufficient to achieve the desired antistatic properties for a particular application. The amounts can be determined empirically and can be adjusted as necessary or desired to achieve the antistatic properties without compromising the properties of the polymer (or other insulating material). Generally, the antistat(s) can be added in amounts ranging from about 0.1 to about 50 percent by weight (preferably, from about 0.1 to about 10 percent; more preferably, from about 0.75 to about 1.5 percent) based on the weight of polymer (or other insulating material).

In topical treatment of an insulating material, the antistat(s) can be employed alone or in the form of aqueous suspensions, emulsions, or solutions, or as organic solvent (or organic solvent/water) solutions, suspensions, or emulsions. Useful organic solvents include chlorinated hydrocarbons, alcohols (for example, isopropyl alcohol), esters, ketones (for example, methyl ethyl ketone), and mixtures thereof. Generally, the solvent solutions can contain from about 0.1 to about 50 percent, or even up to about 90 percent, by weight non-volatile solids (based on the total weight of the components). Aqueous suspensions, emulsions, or solutions are generally preferred and generally can contain a non-volatile solids content of about 0.1 to about 50 percent, preferably, about 1 to about 10 percent, by weight (based on the total weight of the components). Alternatively, however, topical treatment can be carried out by applying (to at least a portion of at least one surface of at least one insulating material) a topical treatment composition that comprises at least one antistat that is liquid at the use or treatment temperature. This topical treatment process can involve the use of the neat liquid antistat(s), without added solvent, and is thus preferred from an environmental perspective over the use of organic solvent solutions of the antistat(s).

The topical treatment compositions comprising the antistat(s) can be applied to an insulating material by standard methods such as, for example, spraying, padding, dipping, roll coating, brushing, or exhaustion (optionally followed by the drying of the treated material to remove any remaining water or solvent). The material can be in the form of molded or blown articles, sheets, fibers (as such or in aggregated form, for example, yarn, toe, web, or roving, or in the form of fabricated textiles such as carpets), woven and nonwoven fabrics, films, etc. If desired, the antistat(s) can be co-applied with conventional fiber treating agents, for example, spin finishes or fiber lubricants.

The topical treatment compositions can be applied in an amount sufficient to achieve the desired antistatic properties for a particular application. This amount can be determined empirically and can be adjusted as necessary or desired to achieve the antistatic properties without compromising the properties of the insulating material.

Any of a wide variety of constructions can be made from the composition of the invention, and these constructions find utility in any application where some level of antistatic characteristic is required. For example, the composition of the invention can be used to prepare films and molded or blown articles, as well as fibers (for example, melt-blown or melt-spun fibers, including microfibers) that can be used to make woven and nonwoven fabrics. These films, molded or blown articles, fibers, and fabrics exhibit antistatic characteristics under a variety of environmental conditions and can be used in a variety of applications.

For example, molded articles comprising the composition of the invention can be prepared by standard methods (for example, by high temperature injection molding) and are particularly useful as, for example, headlamp covers for automobiles, lenses (including eyeglass lenses), casings or circuit boards for electronic devices (for example, computers), screens for display devices, windows (for example, aircraft windows), and the like. Films comprising the composition of the invention can be made by any of the film making methods commonly employed in the art. These films can be nonporous or porous (the latter including films that are mechanically perforated), with the presence and degree of porosity being selected according to the desired performance characteristics. The films can be used as, for example, photographic films, transparency films for use with overhead projectors, tape backings, substrates for coating, and the like.

Fibers comprising the composition of the invention can be used to make woven or nonwoven fabrics that can be used, for example, in making medical fabrics, medical and industrial apparel, fabrics for use in making clothing, home furnishings such as rugs or carpets, and filter media such as chemical process filters or respirators. Nonwoven webs or fabrics can be prepared by processes used in the manufacture of either melt-blown or spunbonded webs. For example, a process similar to that described by Wente in "Superfine Thermoplastic Fibers," Indus. Eng'g Chem. 48, 1342 (1956) or by Wente et al. in "Manufacture of Superfine Organic Fibers," Naval Research Laboratories Report No. 4364 (1954) can be used. Multi-layer constructions made from nonwoven fabrics enjoy wide industrial and commercial utility, for example, as medical fabrics. The makeup of the constituent layers of these multi-layer constructions can be varied according to the desired end-use characteristics, and the constructions can comprise two or more layers of melt-blown and spunbonded webs in many useful combinations such as those described in U.S. Pat. No. 5,145,727 (Potts et al.) and U.S. Pat. No. 5,149,576 (Potts et al.), the descriptions of which are incorporated herein by reference.

The antistat(s) of the present invention can also find utility as additives to coatings (for example, polymer or ceramer coatings). These coatings can be used in the photographic industry or as protective coatings for optical or magnetic recording media.

If desired, the composition of the invention can further contain one or more conventional additives commonly used in the art, for example, dyes, pigments, antioxidants, ultraviolet stabilizers, flame retardants, surfactants, plasticizers, tackifiers, fillers, and mixtures thereof. In particular, performance enhancers (for example, polymers such as polybutylene) can be utilized to improve the antistatic characteristics in, for example, melt additive polyolefin applications.

EXAMPLES

The present invention will be further described with reference to the following non-limiting examples and test methods. All parts, percentages, and ratios are by weight unless otherwise specified.

Examples

TABLE 1

Table of Components

| COMPONENT | DESCRIPTION | AVAILABLE FROM/PREPARATION |
|---|---|---|
| Bis(trifluoromethanesulfonyl)imide | $HN(SO_2CF_3)_2$ | See preparation of Antistat 3 |
| Dimethyl Sulfate | $(CH_3O)_2SO_2$ | Sigma-Aldrich, Milwaukee, Wisconsin |
| JEFFAMINE ™ XJT-506 | $[CH_3(OCH_2CH_2)_{19}(OCH_2CHCH_3)_2NH_2]$ | Huntsman, Houston, Texas. |
| JEFFAMINE ™ XJT-500 | $[H_2NCH(CH_3)CH_2[OCH(CH_3)CH_2]_a[OCH_2CH_2]_{8.5}[OCH_2CH(CH_3)]_cNH_2]$ (a + c = 2.5) | Huntsman |
| ETHOQUAD ™ C/25 | $[C_{12}H_{25}N^+(CH_3)(CH_2CH_2O)_mH(CH_2CH_2O)_nH^-Cl]$ (m + n = 15) | Akzo Nobel Surface Chemistry LLC, Chicago, Illinois |
| ETHOQUAD ™ 18/25 | $[C_{18}H_{37}N^+(CH_3)(CH_2CH_2O)_mH(CH_2CH_2O)_nH^-Cl]$ (m + n = 15) | Akzo Nobel Surface Chemistry LLC |
| HQ-115 ™ | $LiN(SO_2CF_3)_2$ | Minnesota Mining and Manufacturing Company (3M), St. Paul, MN |
| Isopropyl ether | $[(CH_3)_2CH]_2O$ | Sigma-Aldrich |
| MEK | Methyl ethyl ketone; 2-Butanone; $CH_3C(O)C_2H_5$ | Sigma-Aldrich |
| Methylene chloride | Dichloromethane; $CH_2Cl_2$ | Sigma-Aldrich |
| POSF | Perfluorooctane sulfonyl fluoride | As prepared in U.S. Pat. No. 2,732,398. |
| Potassium POSF | Potassium perfluorooctanesulfonate | Prepared according to U.S. Pat. No. 2,732,398, with the exception that starting material $CH_3(CH_2)_7SO_2Cl$ was replaced with $CH_3(CH_2)_7SO_2F$. |
| PBSF | Perfluorobutanesulfonyl fluoride | 3M |
| $C_4F_9SO_3K$ | Potassium perfluorobutane sulfonate | 3M |
| PP3960 | FINA ™ 3960 polypropylene, having a melt flow index of about 400 | FINA Oil & Chemical Co. LaPorte, Texas |
| Sulfuric Acid | $H_2SO_4$ | Sigma-Aldrich |

Test Methods

Test Method I—Thermal Gravimetric Analysis (TGA)

The thermal decomposition of each salt was determined by thermal gravimetric analysis (TGA) under an inert nitrogen atmosphere using a 10° C. per minute temperature ramp using a PerkinElmer Thermogravimetric Analyzer TGA 7, manufactured by PerkinElmer Instruments of Norwalk, Conn.

Test Method II—Static Charge Dissipation Test

The static charge dissipation characteristics of nonwoven fabrics, films, and molded sheets were determined using this method. The test materials were cut into 9 cm by 12 cm samples and conditioned at relative humidities (RH) of about 10 percent, 25 percent, and 50 percent for at least 12 hours. The materials were tested at temperatures that ranged from 22-25° C. The static charge dissipation time was measured according to Federal Test Method Standard 10113, Method 4046, "Antistatic Properties of Materials", using an ETS Model 406C Static Decay Test Unit (manufactured by Electro-Tech Systems, Inc., Glenside, Pa.). This apparatus induces an initial static charge (Average Induced Electrostatic Charge) on the surface of the flat test material by using high voltage (5000 volts), and a field meter allows observation of the decay time of the surface voltage from 5000 volts (or whatever the induced electrostatic charge was) to 10 percent of the initial induced charge. This is the static charge dissipation time. The lower the static charge dissipation time, the better the antistatic properties are of the test material. All reported values of the static charge dissipation times in this invention are averages (Average Static Decay Rate) over at least 3 separate determinations. Values reported as >60 seconds indicate that the sample tested has an initial static charge that cannot be removed by surface conduction and is not antistatic. When the sample tested did not accept a charge of about 3000 volts or more, it was not considered to have charged sufficiently to be antistatic. Samples were tested in order of decreasing relative humidity. If the value of the Average Static Decay Rate had a reported value of >60, testing of samples conditioned at lower relative humidities were discontinued.

Test Method III—Surface Tension Determination

All surface tensions were determined using a Kruss K12 Tensiometer. It was integrated with an automatic dosimat and a computer, using a software package for dynamic contact angle (K121). The program was run using a Wilhelmy platinum plate (PL12) and glass sample vessel (GL7). All parts referenced above including instrument and computer can be purchased directly from Kiruss USA, Charlotte, N.C.

Test Method IV—Surface Resistivity Test

The Surface Resistivity Test was conducted according to the procedure of ASTM Standard D-257; "D.C. Resistance or Conductance of Insulating Materials". The surface resistivity was measured under these conditions using an ETS Model 872 Wide Range Resistance Meter fitted with a Model 803B probe (Electro-Tech Systems, Inc., Glenside, Pa.). This apparatus applies an external voltage of 10 Volts across two concentric ring electrodes and provides surface resistivity readings in ohm/cm$^2$. The room temperature was 72° F. and there was a 27% relative humidity.

Preparation and Characterization of Antistats for Static Charge Dissipation Testing Antistat 1

$(a+c=2.5)$; JEFFAMINE™ XJT 500 DBI salt

An oven-dried, 600 mL Parr reactor (Parr Instrument Company, Moline, Ill.) constructed of Hastalloy and Monel and equipped with a MAGNERON™ stirrer, Parr 4843 controller (Parr Instrument Company), a needle valve for gaseous NH$_3$ addition, a dip tube for liquid product removal, 600 psi (4.1 MPas) pressure gauge, thermocouple probe and a heating mantle was vacuum charged with 187.2 grams anhydrous triethylamine and 362.5 grams high purity perfluorobutanesulfonylfluoride. The reactor body was then chilled in a dry ice bath to approximately −20° C. Once cool, the reactor was charged with 9.0 grams anhydrous ammonia gas, introduced through a needle valve attached to the reactor head assembly to allow precise gas metering from the gas cylinder mounted on an adjacent balance. Once all the ammonia was added, the reactor was mounted in its stand with a heating mantle, stirring was begun at full speed (700 RPM) and the reactor temperature was rapidly ramped to 90° C. A maximum pressure of 100 psi (690 kPa) was reached at approximately 20° C. during the temperature ramp. Increasing the reactor temperature beyond 40° C. resulted in a rapid drop in pressure as ammonia was rapidly consumed. Once the set-point temperature of 90° C. was reached, the temperature was held at this value for 19 hours (overnight). At the end of the heating cycle, residual C$_4$F$_9$SO$_2$F and triethylamine were removed by vacuum stripping for approximately one hour at 90° C., 40 Torr through the gas port in the reactor head while stirring. Volatiles were collected in a dry ice trap. The reactor was then allowed to cool to near room temperature and the crude product was collected in a polyethylene bottle by pressurizing the reactor with about 10 psi (69 kPa) nitrogen and forcing the liquid contents out the dip tube. Without disassembling or cleaning the reactor, this exact procedure was repeated a second time to generate a second batch of crude product. The combined crude product collected from batches 1 and 2 totaled 976.9 grams. Although liquid initially, the crude product partially solidified upon standing for long periods at room temperature.

A total of 975 grams of material was melted in the oven at 50° C. and was washed in a flask with 1800 grams of water at 44° C. The top water phase was removed using a TEFLON™ tube at the end of a black rubber hose attached to an aspirator and the bottom dark brown fluorochemical phase was washed again with 1800 ml water at 57° C., then allowed to cool to 17° C. at which point the stirring was stopped and the material solidified. The top water layer was then removed using a TEFLON™ tube at the end of a black rubber hose attached to an aspirator. The brown fluorochemical phase was washed with water three more times as before. A total of 744 grams of liquid (C$_2$H$_5$)$_3$NH$^{30}$ $^-$N(SO$_2$C$_4$F$_9$)$_2$ was poured out of the flask at 77° C.

The water-washed (C$_2$H$_5$)$_3$NH$^+$ salt, above was placed back in a flask and the material was heated at 10 mm Hg (1.3 kPa) vacuum at 77° C. for one hour to remove the dissolved water (49 grams). At this time the vacuum was broken, and 419 grams of 94-96% sulfuric acid was added to the dried (C$_2$H$_5$)$_3$NH$^{+-}$N(SO$_2$C$_4$F$_9$)$_2$ with stirring. The temperature increased to 93° C. The imide acid was distilled from the sulfuric acid at 4 mm to give 551 grams of HN(SO$_2$C$_4$F$_9$)$_2$ that distilled at 110-125° C. Water analysis revealed the product contained 4 weight percent water.

A total of 760 grams (MW=581, 1.26 moles) of HN(SO$_2$C$_4$F$_9$)$_2$ which was 96% active and 4% water, was dissolved in 760 grams of hplc grade water in a 3 liter flask fitted with and overhead stirrer, thermocouple, and addition funnel. While stirring, 398 grams of JEFFAMINE™ XJT-500 (MW 600, 0.66 moles), available from Huntsman Corporation, Salt Lake City, Utah., was added to the batch at 70° C. over a 30 minute period. The batch was stirred for an additional 15 minutes and the pH was measured to be in the range of 7 to 8. The batch set point was set at 70° C. and fitted with an overhead distillation apparatus. Vacuum was slowly pulled down on the batch via the receiver. The receiver had been pre-cooled to −78° C. Water was stripped to the receiver until the vacuum reached 13 mm Hg (1.7 kPa.). The batch was held at 70° C. and 13 mm Hg (1.7 kPa.) for an hour. The amber honey-like liquid was poured out into jars and weighed. A total of 1042 grams of material was isolated.

21

Antistat 2 where x+y+z~5.3; JEFFAMINE™ T-403 DBI salt

A total of 100 grams (MW=581, 0.165 moles) of $HN(SO_2C_4F_9)_2$ which was 96% active and 4% water, was dissolved in 175 grams of methyl t-butyl ether in a 1 liter flask fitted with and overhead stirrer, thermocouple, and addition funnel. While stirring 49 grams of JEFFAMINE™ T-403 (MW 440, 0.11 moles), available from Huntsman Corporation, Salt Lake City, Utah., was added to the batch at 70° C. over a 30 minute period. The batch was stirred for an additional 15 minutes and the pH was measured to be in the range of 7 to 8. The batch set point was set at 70° C. and fitted with an overhead distillation apparatus. The methyl t-butyl ether was stripped at atmospheric pressure until the pot temperature reached 80° C. Residual solvent and water were stripped to the receiver until the vacuum reached 13 mm Hg (1.7 kPa.). The batch was held at 70° C. and 13 mm Hg (1.7 kPa.) for an hour. The amber very thick liquid was poured out into jars and weighed. A total of 116 grams of material was isolated.

Antistat 3 where x+y+z~5.3; JEFFAMINE™ T-403 DMI salt (i) Preparation of bis(perfluoromethanesulfonyl) imide: $HN(SO_2CF_3)_2$ A 50% aqueous solution of HQ-115™ was placed in glass dishes and dried overnight in an oven at 120° C. This dried material (2276.6 g) was placed in a 5 liter 3 necked round-bottom flask equipped with magnetic stir bar and distillation head with warm water flowing through it. Then sulfuric acid (98%; 4482.2 g) was slowly added to the roundbottom flask. Upon heating the roundbottom flask, distillates were collected in a receiving flask. At a temperature of about 105° C. and a pressure of about 75 mm Hg (10 kPa), a first fraction was collected (84.4 g). Next, the receiving flask was changed and a second fraction was collected under the same temperature and pressure. This fraction was a clear liquid, solidifying at room temperature of $HN(SO_2CF_3)_2$ (1981 g; 88.9% yield; melting point about 40° C.).

Bis(trifluoromethanesulfonyl)imide ($HN(SO_2CF_3)_2$; 185 g (MW=281, 0.33 moles), which was 50% solids in water, was added to a 1 liter flask fitted with an overhead stirrer, thermocouple, and addition funnel. While stirring JEFFAMINE™ T-403 (49 g) was added to the solution at 70° C., over a 30 minute period. The batch was stirred for an additional 15 minutes and the pH was measured as 3. An addition 20 g of JEFFAMINE™ T-403 was added and the pH measured at 6-8. The batch set point was set at 70° C. and fitted with an overhead distillation apparatus. Vacuum was slowly pulled down on the batch via the receiver. The receiver had been pre-cooled to −78° C. Water stripped to the receiver until the vacuum reached 13 mm Hg (1.7 kPa). The batch was held at 70° C. and 13 mm for an hour. The very thick, amber honey-like liquid was poured out into jars and weighed. A total of 151 g of material was isolated.

Antistat 4

Preparation of ; (m+n=15)

A 1 liter flask equipped with a mechanical stirrer was charged with 28.7 grams HQ-115™ and 125.0 grams of water. To this stirred solution, 95.89 grams of ETHOQUAD™ C/25 was added via a dropping funnel, over 16 minutes. The resulting mixture was transferred to a separatory funnel and extracted with 200 grams of methylene chloride. The methylene chloride organic phase was separated from the aqueous phase and washed with 125 mL of water. After washing, the organic phase was placed in a silicone oil bath and distilled at 150° C. for a yield of 108.92 grams (94% yield). The resulting product was characterized by $^1H$ and $^{13}C$ NMR and by thermal gravimetric analysis.

Antistat 5

Preparation of ; (m+n=15)

Antistat 5 was prepared in a manner similar to the preparation of Antistat 1 except that the 1 liter flask was charged with 17.79 grams of HQ-115™ and 125.0 grams of water and 65 grams of ETHOQUAD™ 18/25 were added over 15 minutes, followed by extraction with 200 grams methylene chloride. The organic phase produced a yield of 74.44 grams (96.9% yield) of product that was characterized by $^1H$ and $^{13}C$ NMR and by thermal gravimetric analysis.

Antistat 6

Preparation of

A 2-necked 250 mL roundbottom flask equipped with nitrogen inlet adaptor and magnetic stir bar was charged with JEFFAMINE™ XJT-506 (25.5 g). Next, bis(trifluoromethanesulfonyl) imide (7.03 g) was added from a dropping funnel. After 10 minutes of stirring, 29.96 g (91.7% yield) of a light brown syrup of [CH₃(OCH₂CH₂)₁₉(OCH₂CHCH₃)₂NH₃⁺][⁻N(SO₂CF₃)₂] (pH 6) was isolated.

Antistat 7

[(+)H₃NCH(CH₃)CH₂[OCH(CH₃)CH₂]ₐ[OCH₂CH₂]₈.₅[OCH₂CH(CH₃)]_cNH₃(+)][—N(SO₂CF₃)₂]₂ (a+c=2.5); JEFFAMINE™ XJT-500 [⁻N(SO₂CF₃)₂] salt A 2-necked 250 mL roundbottom flask equipped with nitrogen inlet adaptor and magnetic stir bar was charged with JEFFAMINE™ XJT-500 (15.43 g). Next, bis(trifluoromethanesulfonyl) imide (13.11 g) was added from a dropping funnel. After 10 minutes of stirring, 28.23 g (99.7% yield) of a yellowish syrup of [(+)H₃NCH(CH₃)CH₂[OCH(CH₃)CH₂]ₐ[OCH₂CH₂]₈.₅[OCH₂CH(CH₃)]_cNH₃(+)] [—N(SO₂CF₃)₂]₂ (a+c=2.5) was isolated.

Comparative Antistat 1

Preparation of [(+)H₃NCH(CH₃)CH₂[OCH(CH₃)CH₂]ₐ[OCH₂CH₂]₈.₅[OCH₂CH(CH₃)]_cNH₃(+)][C₈F₁₇SO₃⁻]₂ (a+c=2.5)

To a flask fitted with a stirrer and dropping funnel was added water (275 g) and KOH (117 g); the mixture was stirred until the KOH dissolved. To this solution was added POSF (210 g), over a period of 15 minutes, via addition funnel. After addition the temperature of the solution was 60° C. The flask was heated overnight at 90° C. Upon returning in the morning, the flask was cooled to room temperature and water (620 g) was added. The potassium POSF salt had precipitated as a white, round-shaped solid on the bottom of the flask. The liquid in the flask was removed using a tube with cheesecloth attached to it. The solid remaining in the flask was twice washed with water (700 g), the water being removed each time as specified above. After washings, water (250 g) and isopropyl ether (314 g) were added to the white solid and the flask was immersed in a cooling water bath. Concentrated sulfuric acid (333 g) was slowly added so as to keep the mixture temperature below 65° C. Most of the white solid had dissolved and the mixture was stirred at 60° C. for two hours. The mixture had split into two clear phases; a yellow organic layer on top of an aqueous layer. The organic layer (518 g) was separated from the aqueous layer and charged to a flask along with JEFFAMINE™ XJT 500 (108 g). The pH of the mixture was 1. The pH of the mixture was adjusted to 4 by addition of JEFFAMINE™ XJT 500 (31 g), and two phases ensued. The lower phase was separated from the isopropyl ether phase, returned to the flask, and stripped at atmospheric pressure until the solution temperature was 100° C. The flask was cooled to 95° C. and vacuum was slowly applied until 10 mm Hg (1.3 kPa) was achieved, holding the flask at a temperature of 85° C. for 50 minutes, thus removing residual solvent. The resulting salt [⁺NH₃(CH₂CH₂O)nCH₂CH₂NH₃⁺][C₈F₁₇SO₃⁻]₂ (305 g) was produced with an average water content of 0.96%.

Comparative Antistat 2

Preparation of [CH₃(OCH₂CH₂)₁₉(OCH₂CHCH₃)₂NH₃⁺][⁻O₃SCF₃]

A 2-necked 250 mL roundbottom flask equipped with nitrogen inlet adaptor and magnetic stir bar was charged with JEFFAMINE™ XJT-506 (26.06 g). Next, trifluoromethylsulfonic acid (3.60 g) was added from a dropping funnel. After 10 minutes of stirring, 29.28 g (98.4% yield) of a light brown syrup of [CH₃(OCH₂CH₂)₁₉(OCH₂CHCH₃)₂NH₃⁺][⁻O₃SCF₃] was isolated.

Table 2 lists the surface energy (dyne/cm) versus concentrations (ppm) for material of the invention and comparative perfluoroalkanesulfonate materials.

TABLE 2

|  | 0 ppm | 10 ppm | 100 ppm | 1000 ppm |
|---|---|---|---|---|
| C₈F₁₇SO₃K (comparative) | 72 | 67.68 | 54.09 | 33.17 |
| C₄F₉SO₃K (comparative) | 72 | 70 | 67.5 | 53 |
| C₄F₉SO₂NKSO₂C₄F₉ (comparative) | 72 | 61.85 | 41.61 | 34.02 |
| Antistat 1 | 72 | 34.3 | 33.4 | 28.6 |

Table 3 provides thermal gravimetric data for antistats of the present invention and comparative antistats.

TABLE 3

|  | Wt. % remaining @ given Temp(° C.) | | | |
|---|---|---|---|---|
| ANTISTAT | 200° C. | 240° C. | 280° C. | 320° C. |
| 4 | 99.7 | 99.5 | 99.3 | 98.6 |
| 5 | 99.6 | 99.2 | 98.9 | 98.0 |
| ETHOQUAD™ C/25 | 97.2 | 89.4 | 85.9 | 81.8 |
| ETHOQUAD™ 18/25 | 97.6 | 90.8 | 85.5 | 82.0 |

Antistat 4 (with the same ammonium cation as ETHOQUAD™ C/25 (having a chloride counterion), but having a fluorochemical imide counterion) has less weight loss than ETHOQUAD™ C/25 over the processing range of 200-320° C. Likewise, Antistats 5, (with the same ammonium cation as ETHOQUAD™ 18/25 (having a chloride counterion), but having a fluorochemical imide counterion) has less weight loss than ETHOQUAD™ 18/25 over the processing range of 200-320° C. The greater thermal stability of the compositions of the invention enhances their processability and minimizes evolution of volatile decomposition products.

Topically Coated Polyester Film.

A 1% and 6% solution of the antistatic agent to be tested in methylethyl ketone (MEK) was prepared. About 2 mL of solution was pipetted onto the top of a sheet of polyester film with 25.5 cm by 17.8 cm dimensions. The solution was then drawn over the film using a #12 wire wound bar. The resulting coating was dried in a forced air oven for 2.5 minutes at 65° C. The uncoated polyester film had a surface resistivity out of range of the measuring instrument.

TABLE 4

| Antistat Material | Surface Resistivity 1% MEK solution (Ohm/cm$^2$) | Surface Resistivity 6% MEK (Ohm/cm$^2$) |
|---|---|---|
| Comparative Antistat 1 | $1.6 \times 10^{11}$ | $1.5 \times 10^{11}$ |
| Comparative Antistat 2 | $1.5 \times 10^{12}$ | $1.6 \times 10^{12}$ |
| Antistat 1 | $8.5 \times 10^{9}$ | $3.1 \times 10^{9}$ |
| Antistat 2 | $2.4 \times 10^{10}$ | $1.5 \times 10^{11}$ |
| Antistat 3 | $1.7 \times 10^{9}$ | $1.1 \times 10^{9}$ |
| Antistat 6 | $1.6 \times 10^{9}$ | $7.8 \times 10^{9}$ |
| Antistat 7 | $1.2 \times 10^{9}$ | $3.7 \times 10^{8}$ |

General Preparation of Nonwoven Samples

Nonwoven thermoplastic samples described below were prepared on a 1.9 centimeter (cm) Brabender extruder with a 25.4 cm die (C. W. Brabender, Hackensack, N.J.) into blown microfibers with a diameter of less than about 20 microns (described in: Wente, Van A., "Superfine Thermoplastic Fibers", Industrial and Eng. Chemistry, Vol. 48, No. 8, 1956, pp. 1342-1345, and Naval Research Laboratory Report 111437, Apr. 15, 1954). For PP3960 samples, the first extruder zone was set at 160° C., and all other zones were set at 270° C. The die air temperature was set at 275° C., and the melt temperature was recorded at 279° C. The metering gear pump speed was set at 70 rpm. The die was configured with an air gap setting of 0.763 millimeter (mm) and a set back of 0.69 mm. With a collector distance of 30.5 cm, the take up speed was set to deliver a melt blown nonwoven formed from the microfibers with a basis weight of 50 grams/m$^2$. The nonwoven samples were tested for water and oil repellency according to Test Methods III and IV. The nonwoven samples were also conditioned at 50% relative humidity (23° C.) and tested for static charge dissipation according to Test Method II.

The effective fiber diameter (EFD) was calculated according to the method set forth in Davies, C. N., "The Separation of Airborne Dust and Particles," Institution of Mechanical Engineers, London, Proceedings 1B, 1952.

Example C1 (Comparative)

Samples were prepared according to General Preparation of Nonwoven Samples using PP 3960 polypropylene with no additives. Oil and water repellency and static charge dissipation data are listed in Table 5.

Example C2 (Comparative)

Samples were prepared according to General Preparation of Nonwoven Samples using PP 3960 polypropylene with 1% ETHOQUAD™ C/25. Static charge dissipation data is listed in Table 5.

Example C3 (Comparative)

Sample were prepared according to General Preparation of Nonwoven Samples using PP 3960 polypropylene with 1% ETHOQUAD™ 18/25. Static charge dissipation data is listed in Table 5.

Example 1

Samples were prepared according to General Preparation of Nonwoven Samples using PP 3960 polypropylene and 1% Antistat 5. Static charge dissipation data is listed in Table 5.

Example 2

Samples were prepared according to General Preparation of Nonwoven Samples using PP 3960 polypropylene and 1% Antistat 4. Static charge dissipation data is listed in Table 5.

TABLE 5

Static Charge Dissipation of PP 3960 Nonwovens

| Example | EFD* (microns) | Charge (Kvolts) | | | Decay Rate (seconds) | | |
|---|---|---|---|---|---|---|---|
| | | 10% RH | 25% RH | 50% RH | 10% RH | 25% RH | 50% RH |
| C1 | 7.9 | | | 2.59 | | | >60 |
| C2 | 10.2 | | | 5+ | | | >60 |
| C3 | 10.7 | | | 5+ | | | >60 |
| 1 | 10.4 | 4.1 | 5+ | 5+ | 1.19 | 0.93 | 0.40 |
| 2 | 10.7 | 4.92 | 5.00 | 4.96 | 8.31 | 1.75 | 0.59 |

*Effective Fiber Diameter

Bioelimination Study with Perfluorobutanesulfonate

Comparative study of potassium perfluorobutanesulfonate (using a dose level of 30 mg/kg body weight/day), potassium perfluorohexanesulfonate (using a dose level of 10 mg/kg body weight/day), and potassium perfluorooctanesulfonate (using a dose level of 3 mg/kg body weight/day). The amounts of fluorochemical sulfonate found in the male rat liver tissue samples are shown in Table 6.

TABLE 6

Amount (ppm) of Sulfonate

| Sulfonate | Day 1 | Day 1N* | Day 14 | Day 14N* | Day 28 | Day 28N* |
|---|---|---|---|---|---|---|
| $C_8F_{17}SO_3^-$ | 419 ± 86 | 419 | 309 + 34 | 309 | 237 ± 25 | 237 |
| $C_6F_{13}SO_3^-$ | 327 ± 52 | 98 | 61.9 ± 11.7 | 19 | 36.3 ± 7.4 | 11 |
| $C_4F_9SO_3^-$ | 3.09 ± 1.58 | 0.31 | 0.126 ± 0.084 | 0.0126 | 0.025 ± 0.015 | 0.0025 |

*Normalized to a feeding level of 3 mg/kg body weight per day.

The results in Table 6 show unexpectedly fast and effective elimination of $C_4F_9SO_3^-$ as demonstrated by the extremely small amounts found, particularly relative to $C_6F_{13}SO_3^-$ and $C_8F_{17}SO_3^-$. Immediately following completion of feeding, $C_6F_{13}SO_3^-$ was a factor of 1.3 lower than $C_8F_{17}SO_3^-$, but $C_4F_9SO_3^-$ was more than a factor of 100 lower than $C_6F_{13}SO_3^-$. At 28 days following completion of feeding, $C_6F_{13}SO_3^-$ was a factor of 6.5 lower than $C_8F_{17}SO_3^-$, but $C_4F_9SO_3^-$ was more than a factor of 1400 lower than $C_6F_{13}SO_3^-$. After normalization to the same feeding levels, at 28 days following completion of feeding, $C_6F_{13}SO_3^-$ was a factor of 21.5 lower than $C_8F_{17}SO_3^-$, but $C_4F_9SO_3^-$ was a factor of 4400 lower than $C_6F_{13}SO_3^-$.

Various modifications and alterations to this invention will become apparent to those skilled in the art without departing from the scope and spirit of this invention. It should be understood that this invention is not intended to be unduly limited by the illustrative embodiments and examples set forth herein and that these examples and embodiments are presented by way of example only with the scope of the invention intended to be limited only by the claims as set forth herein as follows.

The invention claimed is:

1. An antistatic composition consisting of:
    (a) at least one antistatic agent consisting of:
        (i) at least one anion represented by one of the following formulae:

(A)

or (B)

wherein each $R_f$ is independently a fluorinated alkyl or aryl group that may be cyclic or acyclic, saturated or unsaturated, and may optionally contain catenated or terminal heteroatoms selected from the group consisting of N, O, and S; Q is independently an $SO_2$ or a CO linking group; and X is selected from the group consisting of $QR_f$, CN, halogen, H, alkyl, aryl, Q-alkyl, and Q-aryl; where any two contiguous $R_f$ groups may be linked to form a ring; and
        (ii) at least one cation having at least one polyoxyalkylene moiety bonded to at least one cationic nitrogen center; and
    (b) at least one insulating material.

2. The antistatic composition according to claim 1 wherein said composition is prepared by forming a blend of said antistatic agent and said insulating material.

3. The antistatic composition according to claim 2 wherein said blend is a melt blend.

4. The antistatic composition according to claim 1 wherein said insulating materials is selected from the group consisting of thermoplastic polymers and thermoset polymers.

5. The antistatic composition according to claim 4 wherein said insulating material is a thermoplastic polymer.

* * * * *

UNITED STATES PATENT AND TRADEMARK OFFICE
CERTIFICATE OF CORRECTION

| | | |
|---|---|---|
| PATENT NO. | : 7,893,144 B2 | Page 1 of 1 |
| APPLICATION NO. | : 11/781537 | |
| DATED | : February 22, 2011 | |
| INVENTOR(S) | : Patricia M Savu | |

It is certified that error appears in the above-identified patent and that said Letters Patent is hereby corrected as shown below:

<u>Column 6,</u>
Line 66-67, delete "mono functional." and insert -- monofunctional. --.

<u>Column 11,</u>
Line 17-18, delete "methathesis" and insert -- metathesis --.
Line 37, delete "perfluooctanesulfonate" and insert -- perfluorooctancsulfonate --.

<u>Column 19,</u>
Line 30, delete "Kiruss" and insert -- Kruss --.
Line 54, delete "Hastalloy" and insert -- Hastelloy --.

Signed and Sealed this
Twenty-sixth Day of July, 2011

David J. Kappos
*Director of the United States Patent and Trademark Office*